US012660766B2

(12) United States Patent
Takeda

(10) Patent No.: US 12,660,766 B2
(45) Date of Patent: *Jun. 23, 2026

(54) SYSTEM AND METHOD TO IMPROVE THE PENETRATION OF ULTRAVIOLET LIGHT INTO PLANT BEDS

(71) Applicant: The United States of America, as represented by the Secretary of Agriculture, Washington, DC (US)

(72) Inventor: Fumiomi Takeda, Scotsdale, AZ (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/950,470

(22) Filed: Nov. 18, 2024

(65) Prior Publication Data

US 2025/0072337 A1      Mar. 6, 2025

Related U.S. Application Data

(63) Continuation of application No. 17/825,720, filed on May 26, 2022, now Pat. No. 12,178,170.

(51) Int. Cl.
| *A01G 9/24* | (2006.01) |
| *A01G 7/04* | (2006.01) |
| *A01G 22/05* | (2018.01) |

(52) U.S. Cl.
CPC ............. *A01G 9/249* (2019.05); *A01G 7/045* (2013.01); *A01G 22/05* (2018.02)

(58) Field of Classification Search
CPC ......... A01G 9/249; A01G 22/05; A01G 7/045
See application file for complete search history.

(56) References Cited

U.S. PATENT DOCUMENTS

| 5,040,329 | A | * | 8/1991 | Michaloski | ............ | A01G 7/045 |
| | | | | | | 47/DIG. 6 |
| 10,098,287 | B2 | * | 10/2018 | Heidl | ...................... | A01G 9/247 |
| 11,517,007 | B2 | * | 12/2022 | Hachiya | ................. | A01G 7/045 |
| 2014/0225003 | A1 | | 8/2014 | Koo et al. | | |
| 2018/0049421 | A1 | * | 2/2018 | Hachiya | ................. | A01M 29/10 |
| 2019/0223390 | A1 | | 7/2019 | Oh et al. | | |

FOREIGN PATENT DOCUMENTS

| EP | 2661962 | A1 | * | 11/2013 | ............. | A01G 7/045 |
| EP | 3884769 | A1 | | 9/2021 | | |
| JP | 2005027521 | A | | 2/2005 | | |
| WO | 2005079557 | A1 | | 9/2005 | | |
| WO | WO-2009081272 | A2 | * | 7/2009 | ............. | A01G 7/045 |
| WO | WO-2012111497 | A1 | * | 8/2012 | ............. | A01G 7/045 |

\* cited by examiner

*Primary Examiner* — Kristen C Hayes

(74) *Attorney, Agent, or Firm* — John Fado; Matthew Bussan

(57) ABSTRACT

A strawberry treatment platform includes an outer housing with at least one UV-C light array enclosed in the outer housing, and at least one strawberry plant manipulating assembly that extends downwardly from the outer housing. The strawberry treatment platform is structured so that, as the strawberry treatment platform moves across a strawberry plant bed, the plant manipulating assembly combs through the strawberry plants and creates a canopy gap in the strawberry bed plant canopy so that radiation from the UV-C light array treats the strawberry plants in the strawberry plant bed.

20 Claims, 7 Drawing Sheets

SYSTEM AND METHOD TO IMPROVE THE PENETRATION OF ULTRAVIOLET LIGHT INTO PLANT BEDS

CROSS-REFERENCE TO RELATED APPLICATION

This application is a continuation of U.S. application Ser. No. 17/825,720, filed May 26, 2022, which is fully incorporated herein by reference in its entirety.

FIELD OF THE INVENTION

The disclosed subject matter relates to a system and method for improving the penetration of an ultraviolet treatment light onto growing plant surfaces. Specifically, the current invention describes a system and method of treating a strawberry plant canopy and manipulating growing strawberry plants to create a gap in the strawberry plant canopy that comprises a pathway for ultraviolet-C (UV-C) light to penetrate the plant canopy and treat an area between the plant canopy and the soil line that includes the undersides of the strawberry leaves. In the preferred embodiment the strawberry plants are treated for pathogens and arthropod pests.

BACKGROUND OF THE INVENTION

Plant diseases caused by fungal pathogens and arthropod pests remain a major challenge for both open-field and controlled environment strawberry (*Fragaria* x *ananassa* Duch) production systems. Examples of strawberry pathogens that spread through the air include *Podosphaera aphanis*—which can cause powdery mildew; *Botrytis cinerea*—which causes gray mold; and various viral diseases that are commonly spread by arthropod pests.

The "Anthracnose" strawberry disease has rapidly increased in significance. Anthracnose is caused by several *Colletotrichum* species with different preferences for infection of fruit, leaves, petioles, or the plant crown. Anthracnose is easily spread during wet periods-particularly through (for example) the fluid communication that typically results from splashing rain drops, or overhead irrigation.

The presence of arthropods can also directly impact fruit quality. Arthropods such as two-spotted spider mites, flower thrips, and greenhouse whiteflies (as well as other arthropods) must be controlled to prevent the deterioration of fruit quality and plant productivity.

Fungicides, insecticides, and miticides are traditionally used for controlling these diseases and pests. However, the use of chemicals—particularly on edible specialty crops—should be minimized and controlled. For example, controls should be placed on the application frequency, and on the amounts of chemicals that are applied.

Continuing to primarily rely on chemically based mitigation agents has multiple potential risks and challenges. Major pathogens and arthropod pests may develop a resistance to specific chemical control agents. There is also the ever-present possibility of new government regulations limiting acceptable pesticide use. These challenges are present even as there is an increasing market demand for fruits and vegetables in general, and specifically fruits and vegetables that are free of pesticides/chemicals. Consequently, there is a clear need for alternatives to chemically based treatments and control techniques.

Ultraviolet-C (UV-C) irradiation is routinely used to kill pathogens and arthropod pests in multiple critical/sensitive systems—including hospital air recirculation systems, and water treatment systems. UV-C is also used to control pathogens in the food storage and processing industries, and specifically in postharvest treatment of easily damaged/contaminated products like root vegetables and fruits.

However, despite the considerable benefits of UV-C systems, farmers and crop production managers have been slow to adopt the technology because of the potential damage that UV-C irradiation can cause to growing plants. The amount of UV-C light required to kill a substantial portion of pathogens and arthropod pest populations can also be damaging to plants. Further, the targeted pest and disease-causing pathogens must actually be irradiated with UV-C light to be eliminated. Irradiating the area below and inside the perimeter of the plant canopy requires creating a path for the UV-C light so that the area below the upper surface of the upper leaves is exposed to the UV-C light.

The need exists for a non-chemical system for, not only treating the plant canopy, but also treating an area below the plant canopy. Specifically, a method and apparatus for controlling arthropod pests and pathogens that is capable of penetrating the entire plant canopy and treating the plants without damaging them. The system and associated method described herein comprises a plant treatment platform which includes a UV-C light array in combination with a leaf manipulating assembly so that the leaf manipulating assembly creates a path for the UV-C light to effectively penetrate a targeted plant's upper canopy and thereby treat a greater portion of the plant than currently available systems that lack a leaf manipulating means and/or UV-C lights. Further, the band of UV-C radiation utilized, and the amount of UV-C light emitted is specifically selected to minimize damage to the plant.

In the preferred embodiment, the strawberry treatment platform disclosed herein irradiates strawberry plants with an array of UV-C lights by emitting UV-C light in the range of about 220-260 nm. The UV-C light array is used in combination with an adjustable leaf manipulating assembly (further described infra) which essentially combs through the strawberry leaves in a (preferably) elevated strawberry plant bed so that the UV-C light reaches the strawberry fruit, the petiole, and the underside of the strawberry leaves as well as the top and the underside of the lower leaves which are typically shaded when a light source is above the plant. In the preferred embodiment, the UV-C light and the associated leaf manipulating roller device are mounted on a robotically driven strawberry treatment platform that preferably moves relatively slowly over the strawberry beds.

The inventors determined that by using the leaf manipulation/displacement system described herein, approximately 49.4 percent of UV-C radiation reached the base of the strawberry plants—as compared with about 6.5 percent when the plant canopy was undisturbed.

SUMMARY OF THE INVENTION

This disclosure is directed to a plant treatment system-preferably a strawberry plant treatment system. The strawberry plant treatment system comprises a strawberry treatment platform which includes an outer housing that encompasses at least one UV-C light. The at least one UV-C light is configured to comprise at least one UV-C light array. In the preferred embodiment, the light array comprises multiple UV-C lights. The strawberry treatment platform outer housing at least partially blocks the entry of ambient light into an area illuminated by the UV-C light array. The strawberry treatment platform includes at least one strawberry plant manipulating assembly that extends downwardly from the strawberry treatment plant outer housing. The strawberry plant manipulating assembly creates a gap in the strawberry plant canopy of a strawberry plant bed.

The strawberry treatment system is structured so that as the strawberry treatment platform moves across the strawberry plant bed, the strawberry plant manipulating assembly manipulates strawberry plants in the strawberry plant bed to create a canopy gap in the strawberry plant canopy so that the area under the strawberry plant canopy (including the underside of strawberry plant leaves) is exposed to and treated by the UV-C light array.

Figure 4:
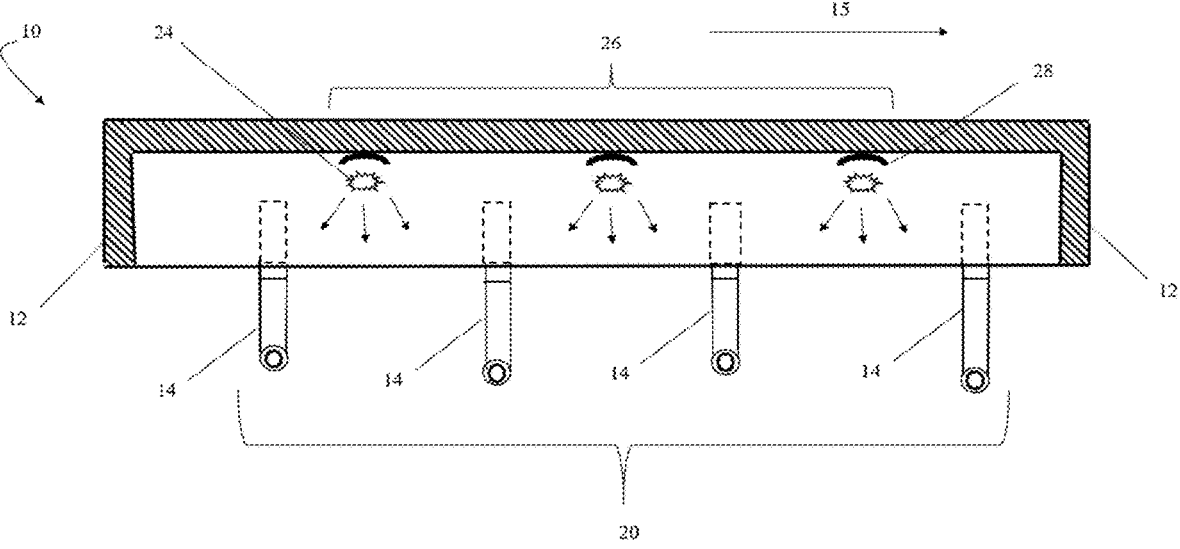
FIG. 4 is a partial sectional schematic side view of the strawberry treatment platform 10 (shown in FIGS. 2 and 3) with a side panel of the platform 10 removed so that the UV-C light array 26 is visible.
Figure 5:
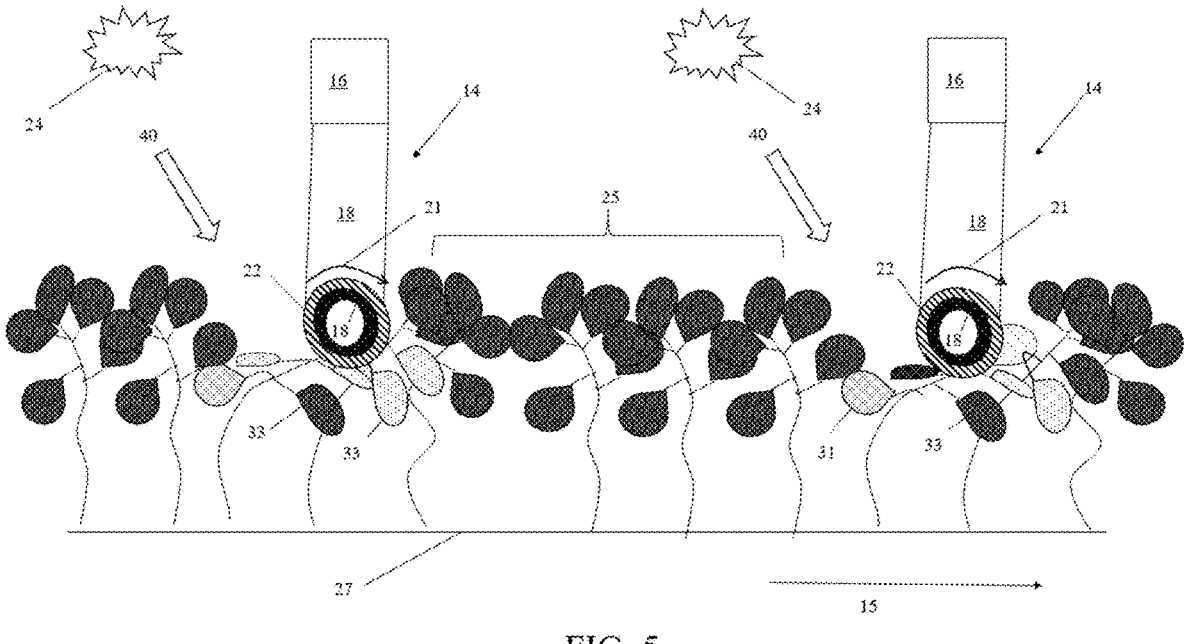
FIG. 5 is a partial sectional schematic side view of the strawberry treatment platform 10 showing a lower portion of the leaf roller assemblies 14 (shown in FIGS. 2-4) as the strawberry treatment platform 10 moves over a bed of strawberries in the direction of the arrow 15.

Note that for clarity, the cross section of the inner tubing bar 18 and roller component 22 are shown as being larger (and not to scale) relative to the other components and strawberry plants shown in FIG. 5. Also note that the UV-C lights 24 are schematically shown in FIG. 5 to illustrate the position of the lights 24 relative to the leaf manipulating roller assemblies 14. The correct placement of the lights 24 relative to the other components of the strawberry treatment platform 10 is more accurately shown in FIG. 4.

Figure 6:
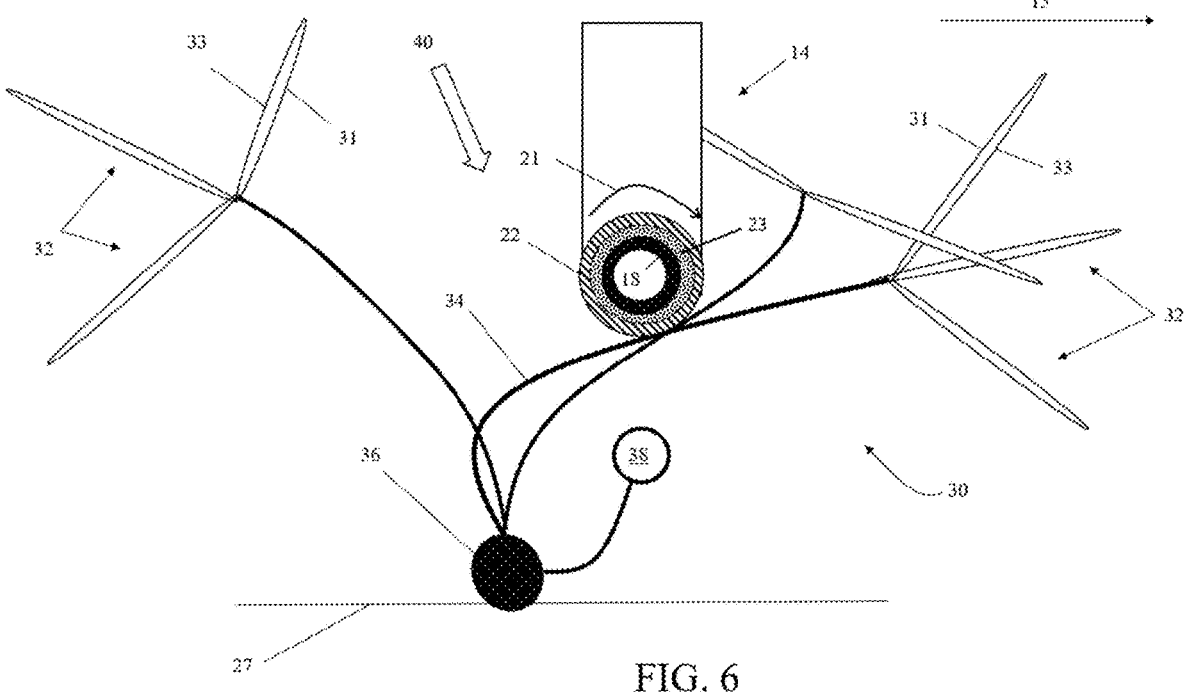
Figure 7:
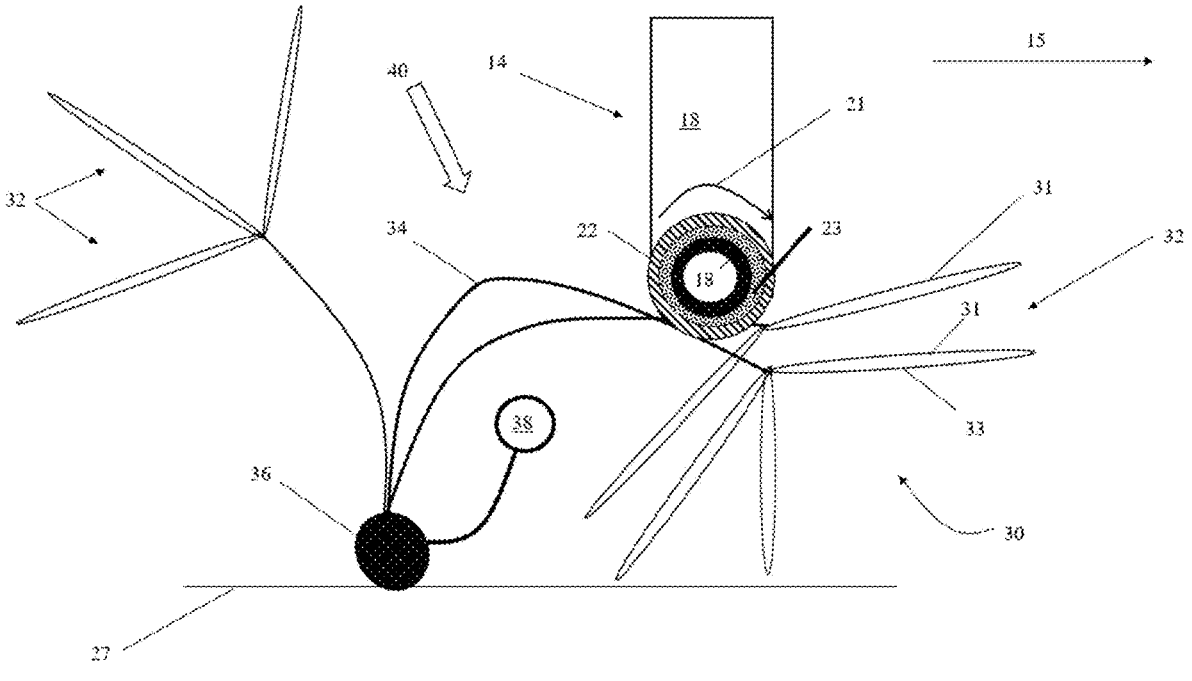

FIGS. 6-7 are schematic diagrams showing an example of the way in which a typical strawberry plant 30 (shown in FIG. 1) can be manipulated by the leaf roller assembly 14 shown in FIGS. 2-5. FIGS. 6-7 also show the rotary bearings means 23 positioned between the inner tubing bar 18 and the roller component 22.

Note that assemblies/systems in some of the FIGs. may contain multiple examples of essentially the same component. For simplicity and clarity, in some FIGs., only one (or a few) of the example components may be identified with a reference number. Unless otherwise specified, other non-referenced components with essentially the same structure as the exemplary component should be considered to be identified by the same reference number as the exemplary component. Also note that the images shown in the FIGs. are not intended to be precisely to scale.

DETAILED DESCRIPTION OF PREFERRED EMBODIMENTS

The preferred embodiment of the current invention comprises a strawberry treatment platform 10, as generally shown in FIGS. 2-7.

Figure 1:
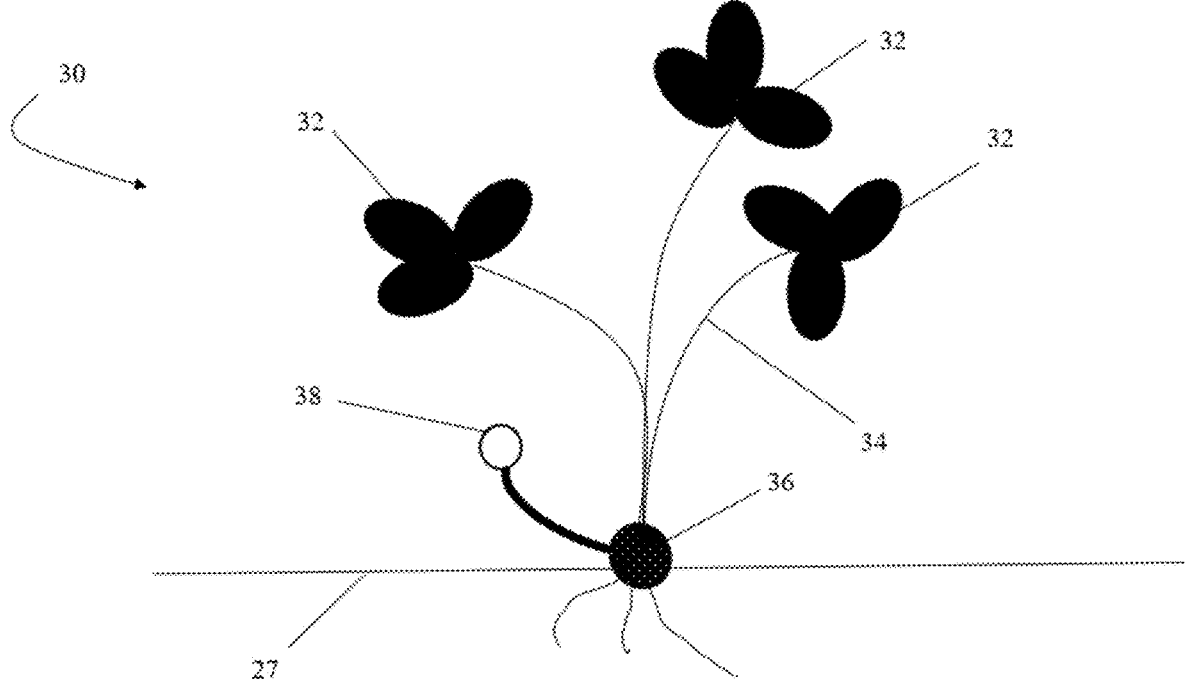
FIG. 1 is a schematic view of a simplified strawberry plant 30. Typically, a mature strawberry plant 30 has developed ten or more "leaves" 32 along with runners and flower/fruit clusters 38. Some or all portion of the strawberry flower/fruit clusters 38 are typically under the leaves 32 and fully or partially shaded by leaves 32. Note that the 3 "leaflets" are collectively referred to as a "leaf" 32.

FIG. 1 shows the basic components of a typical strawberry plant 30. Commercially grown strawberries may grow as tall as 15 inches. Relatively long petioles 34 connect a crown 36 at the base of the plant 30, with the leaves 32. The three leaflets at the top of the petiole are collectively referred to as the plant "leaf" or "leaves". The plant canopy is formed by the upper surface of the leaves 32 at or near the top of the plant, which, together with the leaves of the other strawberry plants in a plant bed, collectively form a strawberry plant canopy 25. Each leaf (3 leaflets) of some strawberry varieties can have a surface area that is as much as 200 cm$^2$. Consequently, the canopy (which may comprise several layers of leaves) may be so dense that little or no sunlight penetrates down to the plant soil line 27. Strawberry fruit 38 is connected to the plant crown 36 by a relatively substantial stalk. The strawberry fruit 38 is typically found in the area between the crown 36 and the plant canopy 25.

Figure 2:
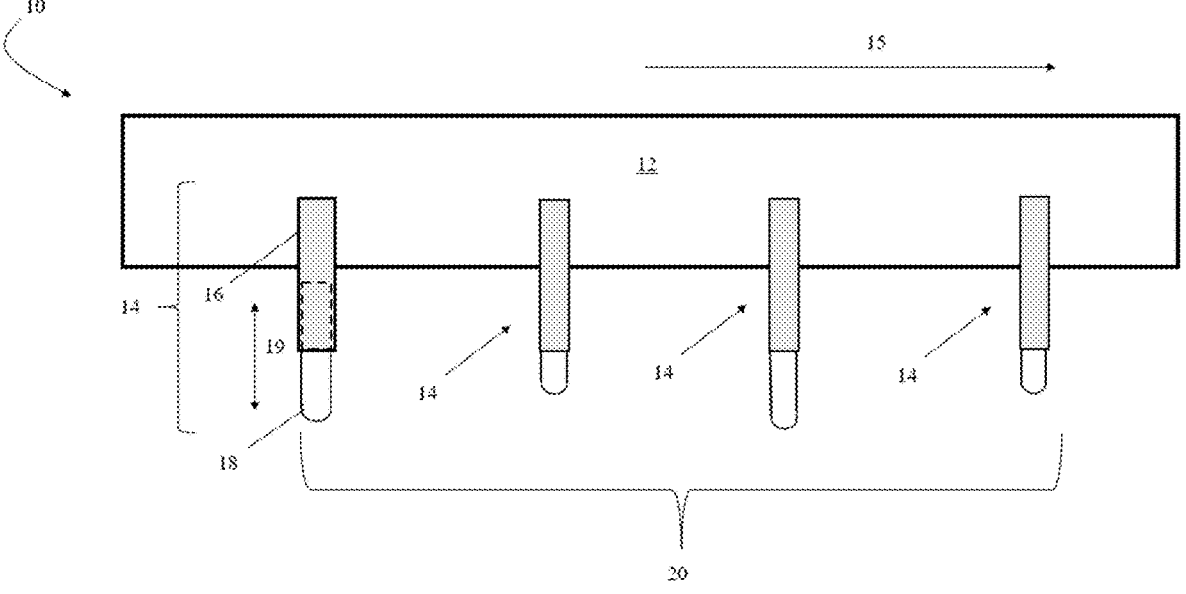
FIG. 2 is a schematic side view of a UV-C strawberry treatment platform 10. In the preferred embodiment, the strawberry treatment platform 10 includes a series 20 of adjustable leaf manipulating roller assemblies 14 that are arranged in series and structured to sequentially manipulate growing strawberry plants in a strawberry plant bed, as the treatment platform 10 moves over the pant bed in the direction of the arrow 15. In the preferred embodiment, the leaf manipulating roller assemblies 14 are spaced about 5 to 6 inches apart.

As best shown in FIG. 2, in the preferred embodiment, at least one (and preferably multiple) strawberry plant-manipulating roller assembly(ies) 14 is connected to an outer housing 12 of the strawberry treatment platform 10. The roller assembly 14 comprises a hollow base tubing structure 16 that extends downwardly from the strawberry treatment platform 10 outer housing 12.

An inner tubing bar 18 slides into (or out of) the hollow base tubing structure 16 so that the length of the roller assembly 14 is adjustable in the direction of the arrow 19, as shown in FIG. 1. The length of the roller assembly 14 can be adjusted as the plant size changes during the growing season. The roller assemblies 14 are arranged in series 20, as best shown in FIGS. 2 and 4. In operation, the leaf manipulating roller assemblies 14 are arranged to sequentially manipulate the strawberry plants in a strawberry plant bed, as the strawberry treatment platform 10 moves over the strawberry plant bed in the direction of the arrow 15. In the preferred embodiment, the roller assemblies 14 are spaced about 5-6 inches apart.

In one embodiment, there is friction fit between the base tubing structure 16 and the inner tubing bar 18 that holds the inner tubing bar 16 in place. In another embodiment, the inner tubing bar 18 may be held in place by a pin or a bolt that extends through both the base structure 16 and the inner tubing bar 18. In additional alternative embodiments, the "U" shaped inner tubing bar 18 may comprise two separate vertical bars connected by a central horizontal bar, so that each vertical bar screws into a corresponding hollow base tubing structure 16. In further embodiments, the inner tubing bar 18 may be connected to the base tubing structure 16 by a connection clamp, tape, a special adhesive, or by any means known in the art consistent with the function of an adjustable connection.

In the preferred embodiment, both the base tubing structure 16 and the inner tubing bar 18 are comprised of a plastic material (e.g. polyvinyl chloride (PVC)). In alternative embodiments, either (or both) the base tubing structure 16 and the inner tubing bar 18 may be comprised of a metal, fiberglass, synthetic material, a composite, or any other food safe material or combination of materials known in the art and consistent with the function described herein.

Figure 3:
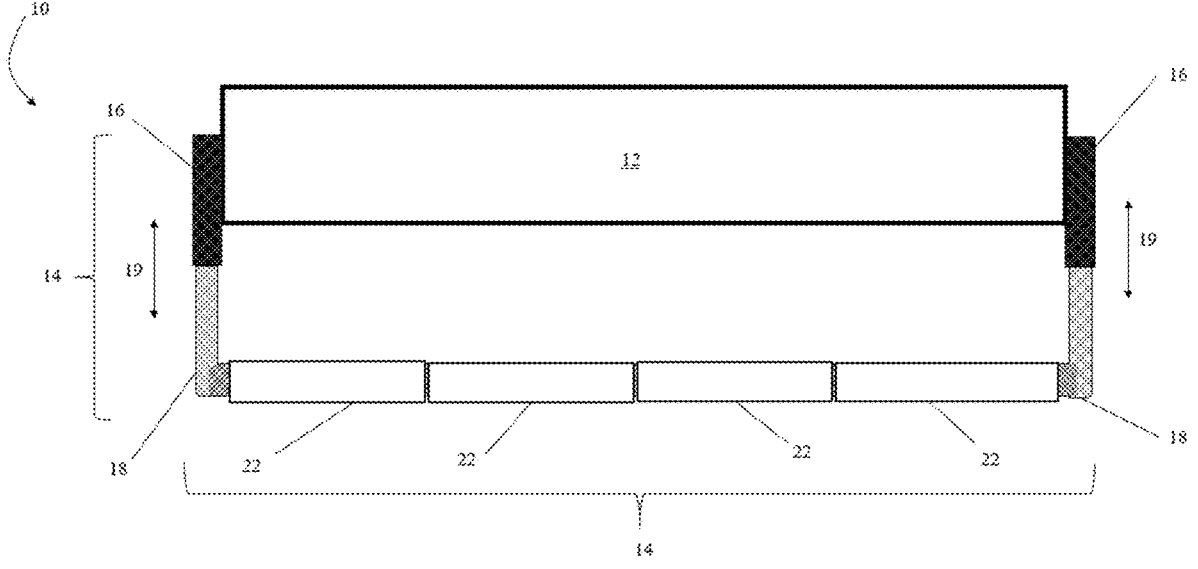
FIG. 3 is a schematic front view of the strawberry treatment platform 10, as shown in FIG. 2. In the preferred embodiment, each leaf manipulating roller assembly 14 comprises at least one (and preferably multiple) roller component(s) 22.

FIG. 3 shows an exemplary front view of the strawberry treatment platform 10. In the preferred embodiment, a series of roller components 22 are positioned along the horizontal cross bar portion of the inner tubing bar 18. As the strawberry treatment platform 10 moves over the strawberry bed, the roller components 22 contact and manipulate (i.e. bend at least the petioles 34 of) the strawberry plants to create a gap 40 in the strawberry plant canopy 25 so that UV-C radiation passes through the gap 40 and penetrates the plant canopy 25 and thereby treats the area under the plant canopy. Simultaneously, as the roller components 22 contact the strawberry plant 30, friction between the roller and the strawberry plant 30 causes the roller components 22 to rotate (i.e. "roll" forward) in the general direction of travel (as shown by the arrow 21 in FIGS. 5-7) over the plants so that any damage to the strawberry plants 30 is minimized. After the roller assembly 14 manipulates and then passes over a strawberry plant 30, the strawberry plant 30 typically snaps back into an upright position—as best shown in FIG. 5.

As best shown in FIGS. 6-7, a rotary bearing means 23 is positioned between the inner tubing bar 18 and a roller component 22 so that the roller component 22 rotates more freely. The rotary bearing means 23 may comprise roller bearings, ball bearings, tapered roller bearings, precision ball bearings, or any other means known in the art for facilitating the rotation of the roller component 22 around a bar (e.g. the inner tubing bar 18).

In another preferred embodiment, the roller components 22 simply rotate around the inner tubing bar 18 (as shown in FIG. 5) without the benefit of a rotary bearing means 23. Although the inner surface of the roller component 22 and/or the corresponding outer surface of the inner tubing bar 18 may be polished and/or lubricated, there is no rotary bearing means 23 or facilitating component between the inner tubing bar 18 and the roller component 22.

In an alternative embodiment, the leaf manipulating roller assembly 14 looks essentially identical to the preferred embodiment, except that the roller components 22 are locked in place and do not rotate. In an additional embodiment, the leaf manipulating assembly 14 also appears essentially identical except that the assembly 14 comprises only a static (non-rolling/non-rotating) horizontal inner tubing bar 18, which manipulates the strawberry leaves 32 as the strawberry treatment platform 10 moves over the strawberry bed.

As generally shown in FIGS. 4, the strawberry treatment platform 10 further comprises at least one UV-C light 24. One or more UV-C lights 24 may comprise a UV-C light array 26. Preferably, each UV-C light array 26 comprises multiple UV-C lights 24. Each of the lights 24 in the UV-C light array 26 is at least partially surrounded by a light reflector/diffusor structure 28. In the preferred embodiment, the UV-C lights emit UV-C radiation in a range of about 220-260 nm.

The strawberry treatment platform 10 outer housing 12 at least partially encloses the UV-C light array 26, and at least partially blocks the entry of ambient light into the area illuminated by the UV-C light array 26. The inventors have found that treatment with the UV-C light array is the most effective when the treatment occurs at night and/or when ambient light is eliminated from the area illuminated by the UV-C light array.

For the purposes of this disclosure, the terms "treat", "treatment", or "treating" describes the exposure of a plant surface (specifically including the underside of a strawberry plant leaf) to radiation and/or chemicals formulated to eradicate arthropod pests, and/or pathogens (e.g. bacteria, fungi, harmful micro-organisms, etc.) that are detrimental to the plant.

For the purpose this disclosure, the term "plant canopy" 25 refers to the plant leaves that are at and/or near the top of a plant in a plant bed. The plant canopy 25 collectively shades an area under the plant canopy 25 in the plant bed (see FIG. 5).

For the purpose of this disclosure, the term "manipulate" means to bend over (preferably forward) or change the position of at least the strawberry plant petioles 34 and their associated leaves 32 to create a gap in the strawberry plant canopy 25 (i.e. a "canopy gap") so that the area under the strawberry plant canopy 25 (including the underside of strawberry plant leaves) is exposed to and treated by a UV-C light array—as best shown in FIGS. 5-7.

For the purposes of this disclosure, a "canopy gap" 40 comprises a path for radiation from a treatment light 24 (such as a UV-C light) to reach the base/soil line 27 of the plants through the "canopy gap 40", as (for example) shown in FIGS. 5-7 of the current disclosure. For the purpose of the current disclosure, a "canopy gap 40" does not occur naturally and is created by a mechanical means such as the plant manipulating assembly 14. The canopy gap 40 exposes the underside of the plant leaves and enables the UV-C radiation to reach the area under the canopy between the canopy and the soil line 27.

As shown in FIGS. 6-7, as the strawberry treatment platform 10 moves progressively further forward in the direction of the arrow 15, the roller assembly 14 pushes the strawberry petioles 34 further forward so that the underside 31 of the strawberry leaves 32 are exposed to, and treated by, radiation from the UV-C light arrays 26 that passes through the canopy gap 40.

The area on the underside 13 of the strawberry leaves 32 is typically moist and sheltered from direct sunlight so that the area is a fertile environment for molds and various types of fungi and arthropod pests. The arthropod pests frequently feed, lay their eggs, and hide from predators in the sheltered areas on the underside 31 of the leaves 32. Exposing the underside 31 of the strawberry leaves 32 to UV-C radiation is critical to eradicating any pathogens and/or arthropod pests—and thereby successfully treating the strawberry plants 30.

In the preferred embodiment, the strawberry treatment platform 10 further comprises a wheeled frame that straddles the strawberry bed, and a means of propelling the strawberry treatment platform 10 along/over the strawberry bed. The propelling means may comprise an electrical, hydraulic, or internal combustion engine, or any other propelling means known in the art. The propelling means may be external to the strawberry treatment platform 10 so that the strawberry treatment platform 10 is pushed or towed. In the preferred embodiment, the strawberry treatment platform further comprises an internal or external controller that may be programmable and controls at least the movement of the strawberry treatment platform 10. Essentially, in the preferred embodiment, the wheeled strawberry treatment platform 10 comprises a programmable, mobile, robotic strawberry treatment system.

For the foregoing reasons, it is clear that the subject matter described herein provides an innovative means of controlling plant pathogens and arthropod pests that infect strawberry plants and other edible crops with UV-C light more efficiently. The current system may be modified in multiple ways and applied in various technological applications. For example, although the preferred embodiment is directed to strawberry plants, other types of crops/plants should be considered within the scope of the invention-specifically including crops/plants that are grown in a cross pattern in well-defined rows and plant beds. The disclosed method and apparatus may be modified and customized as required by a specific operation or application, and the individual components may be modified and defined, as required, to achieve the desired result.

Although most of the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the implied term "about." If the (stated or implied) term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount. Accordingly, unless otherwise indicated, the numerical properties set forth in the following specification and claims are approximations that may vary depending on the desired properties sought to be obtained in embodiments of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein. The term "an effective amount" as applied to a component or a function excludes trace amounts of the component, or the presence of a component or a function in a form or a way that one of ordinary skill would consider not to have a material effect on an associated product or process.

What is claimed is:

1. A plant treatment system comprising:
   a plant treatment platform including an outer housing;
   at least one UV-C light comprising a UV-C light array, the outer housing encompassing the UV-C light array, the outer housing at least partially blocking an entry of ambient light into an area illuminated by the UV-C light array; and,
   at least one plant manipulating assembly extending downwardly from the outer housing, the plant manipulating assembly creating a canopy gap in a plant canopy of a plant bed;
   wherein, as the treatment platform moves across the plant bed, the at least one plant manipulating assembly contacts and directly manipulates plants in the plant bed to create the canopy gap in the plant canopy so that an area under the plant canopy is exposed to and treated by the at least one UV-C light array.

2. The plant treatment system of claim 1 wherein the area under the plant canopy specifically includes undersides of plant leaves.

3. The plant treatment system of claim 1 wherein the plant manipulating assembly comprises an inner tubing bar sliding into a base tubing structure to selectively change a length of the plant manipulating assembly.

4. The plant treatment system of claim 1 wherein the plant manipulating assembly comprises an inner tubing bar that extends across the outer housing so that the inner tubing bar contacts and directly manipulates the plants.

5. The plant treatment system of claim 1, wherein the plant manipulating assembly comprising a U-shaped inner tubing bar that extends across a bottom of the outer housing and passes through an aperture in at least one roller component, the at least one roller component contacting and manipulating the plants.

6. The plant treatment system of claim 5 wherein the at least one roller component rotates in the direction of travel of the plant treatment platform as the plant treatment platform moves over a plant bed.

7. The plant treatment system of claim 6 further comprising a rotary bearing means for facilitating the rotation of the at least one roller component.

8. The plant treatment system of claim 1 wherein the at least one plant manipulating assembly comprises multiple plant manipulating assemblies arranged in series on the plant treatment platform so that the plant manipulating assemblies sequentially manipulate plants in the plant bed as the plant treatment platform moves over and treats plants.

9. The plant treatment system of claim 8 wherein each of the multiple plant manipulating assemblies comprises multiple roller components.

10. The plant treatment system of claim 1 wherein the plant treatment system is configured so that the at least one UV-C light is positioned between two plant manipulating assemblies.

11. The plant treatment system of claim 1 wherein each of the at least one UV-C light arrays comprises multiple UV-C lights.

12. The plant treatment system of claim 1 wherein each of the UV-C light arrays emits UV-C light in a range of about 220-260 nm.

13. The plant treatment system of claim 1 wherein the system further comprises at least one light diffuser/reflector at least partially surrounding each of the at least one of the UV-C lights.

14. A method of treating plants comprising the steps of:
(a) providing the plant treatment system of claim 1,
(b) moving the plant treatment system over a plant bed.

15. The method of claim 14 wherein step (b) is executed at night and/or when ambient light is eliminated from the area illuminated by the UV-C light array.

16. The method of claim 14 wherein, in step (a), an operator adjusts a length of the plant manipulating assembly to effectively treat the plants.

17. The method of claim 14 wherein, in step (a), the plant manipulating assembly includes at least one roller component, the at least one roller component is configured to contact the plants and rotate in the direction of travel of the plant treatment platform as the plant treatment platform moves over the plant bed.

18. A method for treating plants, the method comprising the steps of:
(a) providing a plant treatment platform comprising an outer housing;
(b) positioning at least one UV-C light array under the outer housing;
(c) providing at least one plant manipulating means under the outer housing and adjacent to the at least one UV-C light array; and, (d) moving the plant treatment platform across a plant bed canopy so that as the at least one plant manipulating assembly contacts and directly manipulates plants in the plant bed to create a canopy gap in the plant bed canopy, the UV-C light array treats at least a portion of the plants below the plant canopy.

19. The plant treatment method of claim 18 wherein, in step (b), the at least one UV-C light array emits UV-C light in a range of about 220-260 nm.

20. A system for treating plants, the system comprising:
a plant treatment platform comprising an outer housing;
at least one UV-C light array positioned under the outer housing; and,
at least one plant manipulating assembly positioned under the outer housing and adjacent to the UV-C light array;
wherein as the plant treatment platform moves across a plant bed canopy, the at least one plant manipulating assembly simultaneously contacts and directly manipulates plants to create a canopy gap in the plant bed canopy so that the UV-C light array is positioned to treat at an area between the plant canopy and a soil line.

* * * * *